United States Patent [19]

Joy et al.

[11] Patent Number: 5,036,887

[45] Date of Patent: Aug. 6, 1991

[54] PRESSURE-PRODUCING DEVICE

[75] Inventors: Theodore J. Joy, Mishawaka, Ind.; Tommy Wood, Myrtle Beach, S.C.

[73] Assignees: Allied-Signal Inc., Morristown, N.J.; Maremont Corporation, Carol Stream, Ill.

[21] Appl. No.: 332,631

[22] Filed: Mar. 20, 1989

[51] Int. Cl.[5] .............................................. F16L 55/04

[52] U.S. Cl. ...................................... 138/31; 303/116

[58] Field of Search ...................... 138/26, 31; 60/416, 60/582; 92/117; 303/115, 116; 417/540

[56] References Cited

U.S. PATENT DOCUMENTS

| | | | |
|---|---|---|---|
| Re. 24,382 | 10/1957 | Greer | 138/31 |
| 503,091 | 8/1893 | Krutzsch . | |
| 1,625,751 | 4/1927 | Solberg . | |
| 1,881,255 | 10/1932 | Whitacre . | |
| 2,321,093 | 6/1943 | Lupfer | 138/31 |
| 2,993,472 | 7/1961 | Einsiedler | 121/38 |
| 3,028,881 | 4/1962 | Koomey et al. | 138/30 |
| 3,303,856 | 2/1967 | Taylor | 138/31 |
| 3,467,140 | 9/1969 | Hanson | 138/31 |
| 3,480,336 | 11/1969 | Clark et al. | 303/21 |
| 3,695,731 | 10/1972 | England et al. | 303/7 |
| 3,809,437 | 5/1974 | Inada et al. | 303/21 F |
| 4,043,352 | 8/1977 | Simpson | 138/31 |
| 4,046,167 | 9/1977 | Papp et al. | 138/31 |
| 4,095,851 | 6/1978 | Ando et al. | 303/115 |
| 4,208,952 | 6/1980 | Ditlinger | 92/13 |
| 4,402,554 | 9/1983 | Belart | 303/10 |
| 4,702,532 | 10/1987 | Anderson | 303/115 |
| 4,769,990 | 9/1988 | Bach et al. | 138/31 |

FOREIGN PATENT DOCUMENTS

| | | | |
|---|---|---|---|
| 470941 | 1/1929 | Fed. Rep. of Germany . | |
| 248954 | 1/1970 | U.S.S.R. . | |
| 599791 | 3/1948 | United Kingdom . | |
| 711107 | 6/1954 | United Kingdom | 138/31 |
| 753626 | 7/1956 | United Kingdom . | |
| 767046 | 1/1957 | United Kingdom . | |
| 944514 | 12/1963 | United Kingdom . | |

*Primary Examiner*—James E. Bryant, III

*Attorney, Agent, or Firm*—Larry J. Palguta; Ken C. Decker

[57] ABSTRACT

The pressure-producing device (10) comprises a housing (30) which is slidable relative to a stationary piston (60), the housing (30) movable within a substantially blind bore (12) to effect the pressurization of fluid. A body (14) containing the blind bore (12) includes a retention member (22) located adjacent an end opening (16) of the blind bore (12). The pressure-producing device (10) is received within the blind bore (12) wherein a closed end (32) with a seal (44) thereabout defines with an end of the blind bore (12) a pressurizing chamber (50). The piston (60) is received slidably and sealingly within an interior opening (39) of the housing (30) and extends from an end opening (34) thereof in order to engage the retention member (22) and position stationarily the piston (60). The housing (30) and piston (60) are displaced away from one another by a pressurized medium within the housing (30). The piston's (60) stationary position enables the housing (30) to slide within the blind bore (12) and effect the pressurization of fluid received within the chamber (50).

21 Claims, 1 Drawing Sheet

PRESSURE-PRODUCING DEVICE

Figure 1:
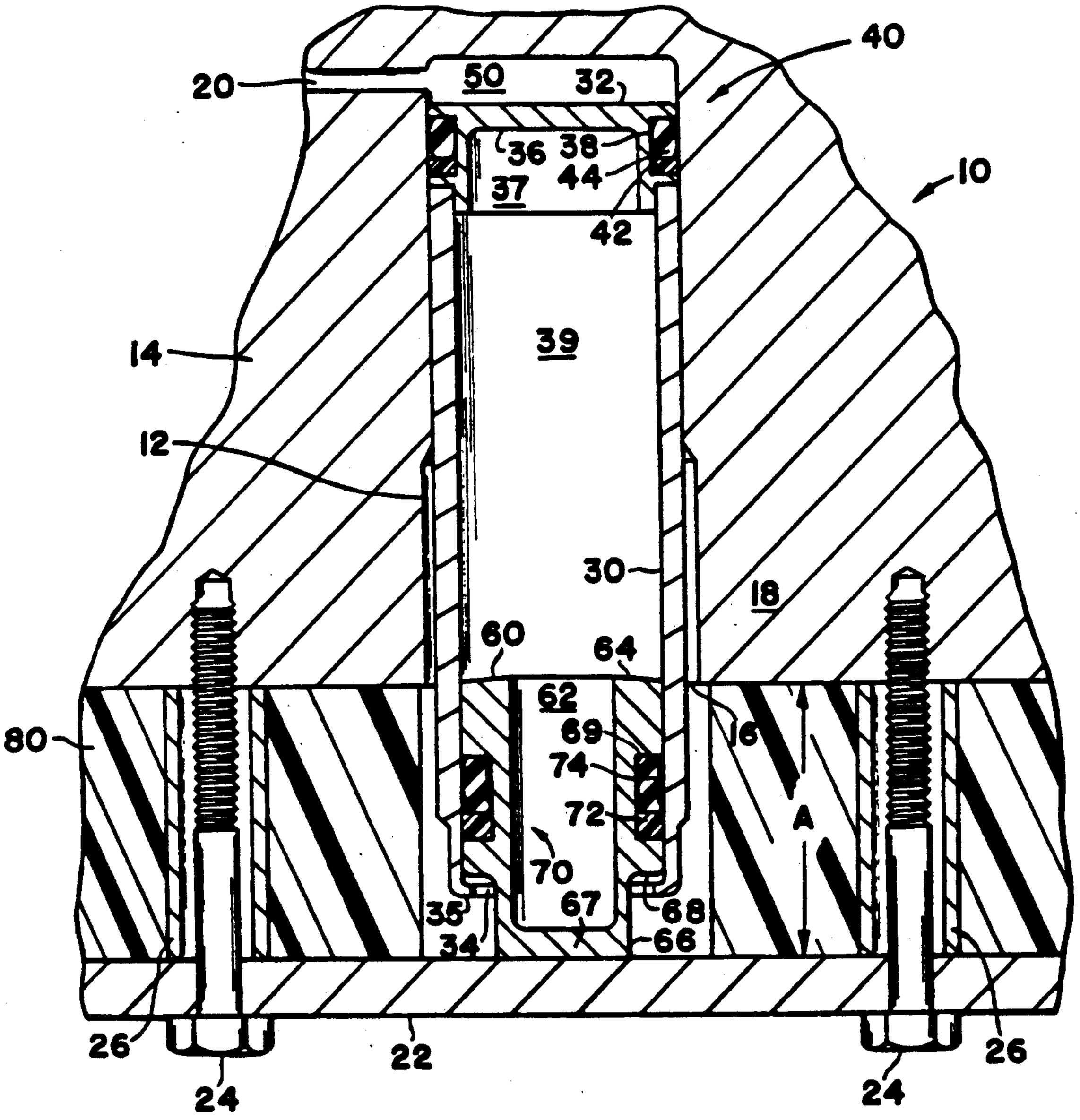

The invention relates generally to a pressure-producing device, in particular to an accumulator or gas spring type of device for pressurizing fluid.

Many pressure-producing devices have been proposed previously in order to ensure that a predetermined pressure is provided by means of the pressure-producing device. Devices such as accumulators and gas springs typically include a large number of parts in order to couple together a housing and piston device, and which necessarily include a number of sealing mechanisms to ensure that a pressurized medium, such as nitrogen, does not escape from the device. The sealing mechanisms must ensure that the pressurized medium does not seep from the pressure-producing device and mix with the pressurized fluid, which can have deleterious effects thereupon.

It is highly desirable to provide a pressure-producing device which requires a minimum number of parts and which is easily assembled and disassembled so that the cost of manufacturing and assembly is reduced substantially. Such a pressure-producing device should be designed so that the pressurized medium does not mix with pressurized fluid, be easily assembled and disassembled within an associated body which receives the device, and provide an extended functional life with reduced degradation over the extended life. The present invention solves the above problems by providing a pressure-producing device of the accumulator or gas spring type which substantially reduces the cost of the unit, provides a unit easier to assemble and disassemble from the body which receives the device, provides operational characteristics which are at least equal to or improved over previous designs, and which by its very simplicity optimizes functional and structural characteristics. The present invention comprises a pressure-producing device received within a body having therein a bore with an opening at an end of the bore, a retention member located at the opening and stationarily disposed relative to the body, the pressure-producing device comprising a pressure-effecting housing disposed slidably within said bore, the housing having a closed end with seal means disposed thereat, the closed end and bore defining a chamber communicating with a passage, an interior opening of the housing extending to an end opening associated with the opening of the bore, piston means located within the interior opening and extending outwardly from said end opening and into engagement with said retention member, and a pressurized medium contained within said interior opening to displace said housing and piston means away from one another, the piston means defining an integral exterior profile which prevents the transmission of pressurized medium through the exterior profile, so that fluid in said chamber is pressurized by said housing for transmission via said passage.

One way of carrying out the invention is described in detail below with reference to the drawing which illustrates an embodiment wherein:

FIG. 1 illustrates the pressure-producing device of the present invention received within a substantially blind bore of a body.

The pressure-producing device of the present invention is indicated generally by reference numeral 10 in FIG. 1. Device 10 may comprise an accumulator or gas spring type of device, both devices operating to effect a pressurization of fluid received within a chamber located at an end of a substantially blind bore 12. The device 10 is received within substantially blind bore 12 of housing or body 14. Blind bore 12 extends to an end opening 16 located at an end 18 of body 14. The end 18 of body 14 has disposed adjacent thereto a stationary retention member or retaining plate 22 which is located fixedly relative to body 14. Retaining plate 22 may be disposed entirely separate from and not connected with body 14, or may be connected directly to body 14 in order to ensure stationary positioning relative thereto. In the above example embodiment, the retention member 22 is attached to the body 14 by means of cap screws 24 and predetermined length sleeves 26. Thus, member 22 is positioned a predetermined distance A from end 18 of body 14. A nonmetallic (plastic) spacer 80 is disposed between body 14 and retention member 22.

Device 10 comprises a housing 30 which includes a closed end 32 and an end opening 34. The end opening 34 of housing 30 includes a rolled-over or crimped end 35 which defines the end opening. Closed end 32 comprises a cap 36 which is attached fixedly to end 32 by any well-known means, such as welding. Closed end 32 may also be integral with housing 30 by means of a single piece extrusion. Cap 36 includes a recessed open area 37 which increases the amount of pressurized medium in housing 30, and an exterior recess or groove 38 receiving therein sealing means 40. Sealing means 40 includes a backup ring 42 and an 0-ring 44. Closed end 32 of housing 30, and specifically the cap 36, defines with blind bore 12 a pressurizing chamber 50. The body 14 includes a passage 20 which transmits pressurized fluid therethrough. Pressurizing chamber 50 receives fluid via passage 20, and in conjunction with the operation of pressure-producing device 10, pressurized fluid is transmitted from chamber 50 and through passage 20. The housing includes an interior opening 39 with a pressurized medium therein, such as nitrogen. Located within interior opening 39 is a piston 60 which is generally U-shaped to define a piston bore 62. Piston 60 is located within crimped end 35 by means of a charging and crimping assembly method that is well known within the art. An illustration of this well-known method is Ludwig U.S. Pat. No. 4,451,964 wherein a piston shaft is located within an upper die assembly and a cylinder or housing is located within a lower die assembly having a line fitting from a gas source (see FIG. 2 therein). As the die assemblies engage (FIG. 3) pressurized gas is introduced via the fitting prior to the upper die assembly crimping the housing end over the piston shaft (FIG. 4). Piston 60 is an integral unit which provides an integral exterior profile that prevents any pressurized medium from being transmitted through the walls or surface of the piston. Piston 60 comprises an enlarged diameter section 64 extending to a reduced diameter section 66. Sections 64, 66 define therebetween a shoulder 68 which may abut the rolled-over end 35. Reduced diameter section 66 includes an end 67 which abuts retention member 22. Piston 60 includes an exterior recess or groove 69 receiving therein sealing mechanism 70. Sealing mechanism 70 comprises a backup ring 72 and a seal 74. Seal 74 slidably and sealingly engages an interior surface of interior opening 39 in order to retain the pressurized medium within opening 39 and piston bore 62. The U-shaped or cup-shaped piston 60, via bore 62, and recessed open area 37 of cap 36, provide an increased interior volume for the containment of a larger quantity of pressurized medium or gas so that a sufficient amount of pressurized medium can be retained over an extended operational life of device 10.

The pressure-producing device is received within blind bore 12 wherein the displacing effect of the pressurized medium within opening 39 and piston bore 62 displaces housing 30 along bore 12 to pressurize fluid within chamber 50. As illustrated in FIG. 1, when retention plate member 22 is attached by means of cap screws 24 and sleeves 26, piston 60 is biased inwardly of housing 30 so that housing 30, by reaction, moves upwardly in bore 12 to pressurize fluid received within chamber 50. As fluid is received within chamber 50, the volume of chamber 50 expands so that the housing 30 is displaced downwardly against the reaction pressure of the pressurized medium in opening 39 and piston bore 62. The reaction pressure of the pressurized medium biases housing 30 against the fluid in chamber 50 to effect pressurization thereof, so that pressurized fluid is available for transmission through passage 20.

The pressure-producing device 10 described above is particularly useful as an accumulator in an adaptive braking system for vehicles. The body 14 may comprise a modulator housing 14 which typically receives solenoid valves, accumulators and other components. The pressurized fluid received within chamber 50 is a pressurized brake fluid which is pumped under pressure into chamber 50, via passage 20, so that housing 30 is displaced along bore 12. When the adaptive braking system needs pressure within the hydraulic circuits thereof, this pressure is available instantaneously via the pressurized fluid contained in chamber 50 and effected by accumulator 10.

The pressure-producing device of the present invention provides numerous and substantial advantages over prior pressure-producing devices. The device requires substantially fewer parts which contributes to a significant reduction in cost, an enhanced reliability of design, and an improved operational life. Because there are fewer parts, there are fewer possible failures or defects and therefore the operational life and reliability are improved. By utilizing a movable housing for effecting pressurization of fluid within chamber 50, end cap 36 serves the dual function of sealing the pressurized medium within the interior of housing 30 and piston 60 and being a pressure-effecting piston means for the fluid received within chamber 50. Assembly time is drastically reduced because an accumulator is simply removed from a shipping container and installed directly in the modulator housing. The installation can be done by hand with no additional fixtures, tools, or presses required. Assembly cost is substantially reduced because during assembly there is only one part, the accumulator, that is handled. When the accumulator is inserted into the blind bore of modulator housing 14, the accumulator centers automatically in the bore. Retention plate 22 is common to a number of solenoid valves received within the modulator housing. Thus, the plate can be removed to allow easy access and servicing of solenoid valves and the accumulator. A substantial benefit of the present invention is sealing mechanism 70 being located adjacent end opening 16 of modulator housing 14, which is at an end of bore 12 that is opposite where pressurized fluid is contained within chamber 50. The pressurized medium, if it should leak, would not seep into the brake fluid, and likewise brake fluid, if it should seep beyond sealing means 40, will not enter into the interior opening 39 of housing 30. The majority of accumulator 10 is buried within modulator housing 14 with the remaining portion surrounded by the spacer 80 so that the accumulator is completely out of sight. Because the accumulator or device is not exposed, it cannot be damaged by being hit by other objects, and the result is a very streamlined housing assembly with no objects protruding therefrom. Because of the overall design and performance of the pressure-producing device, the performance of the device should be equal to or better than previous constructions and also have an extended performance life due to less degradation over an extended length of time.

We claim:

1. A pressure-producing device received within a body having therein a bore with an opening at an end of the bore, a retention member located, at the opening and stationarily disposed relative to the body, the pressure-producing device comprising a pressure-effecting housing disposed slidably within said bore, the housing having a closed end with means for sealing disposed thereat, the closed end and bore defining a chamber communicating with a passage, an interior opening of the housing extending to an end opening associated with the opening of the bore, a piston located within the interior opening and extending outwardly from said end opening and into continuous stationary engagement with said retention member, and a pressurized medium contained within said interior opening to displace said housing and piston away from one another, the piston defining an integral exterior profile which prevents the transmission of pressurized medium through the exterior profile, so that fluid in said chamber is pressurized by said housing for transmission via said passage.

2. The pressure-producing device in accordance with claim 1, wherein the piston is generally cup-shaped in order to maximize the amount of pressurized medium contained within said interior opening and piston.

3. The pressure-producing device in accordance with claim 1, wherein said retention member is fixedly attached to said body in order to provide stationary engagement means for said piston.

4. The pressure-producing device in accordance with claim 3, wherein said housing has at said end opening a rolled-over end which retains said piston within the housing.

5. The pressure-producing device in accordance with claim 4, wherein said piston includes a sealing mechanism disposed thereabout, the sealing mechanism engaging slidably a surface of the interior opening.

6. The pressure-producing device in accordance with claim 1, wherein the retention member is attached to the body by means of screws received within sleeves.

7. The pressure-producing device in accordance with claim 1, wherein said chamber has a single passage which transmits therethrough said pressurized fluid.

8. An accumulator for effecting fluid pressure, said accumulator cooperating with a substantially blind bore of a body, the accumulator comprising a slidable accumulator housing having a closed end received in said bore and defining with said bore a pressurizing chamber, the closed end disposed opposite an end opening of the housing, a piston received in an interior opening of the housing, said piston extending from said end opening of the housing and having means for slidably and sealingly engaging an interior surface of said interior opening, a pressurized medium disposed within said accumulator in order to displace apart the housing and piston, the piston defining an integral piston profile which retains completely pressurized medium within said profile, and the piston engaging continuously and stationarily a stationary element disposed stationary relative to said body, so that said accumulator housing moves in said bore to pressurized fluid within said chamber.

9. The accumulator in accordance with claim 8, wherein the closed end of the accumulator housing comprises a cap attached fixedly to said housing and includes a recessed open area which increases the amount of pressurized medium contained within said interior opening.

10. The accumulator in accordance with claim 8, wherein said chamber includes at least one passage for transmitting pressurized fluid therethrough.

11. The accumulator in accordance with claim 10, wherein said piston comprises a generally U-shaped cross-section piston which permits an increased amount of pressurized medium to be contained within said piston and interior opening.

12. The accumulator in accordance with claim 11, wherein said stationary element is fixedly attached to said body to provide a stationary abutment for said piston.

13. A pressure-producing device received within a body having therein a bore with an opening at an end of the bore, a retention member located at the opening and stationarily disposed relative to the body, the pressure-producing device comprising a pressure-effecting housing disposed slidably within said bore, the housing having a closed end with means for sealing disposed thereat, the closed end and bore defining a chamber communicating with a passage, an interior opening of the housing extending to an end opening associated with the opening of the bore, a piston located within the interior opening and extending outwardly from said end opening and into engagement with said retention member, and a pressurized medium contained within said interior opening and comprising nitrogen which precharges said body and piston to displace said housing and piston away from one another, the piston defining an integral exterior profile which prevents the transmission of pressurized medium through the exterior profile, so that fluid in said chamber is pressurized by said housing for transmission via said passage.

14. The pressure-producing device in accordance with claim 13, wherein said body comprises a modulator body for an adaptive braking system, and said pressure-effecting housing and piston comprise an accumulator.

15. An accumulator for effecting fluid pressure, said accumulator cooperating with a substantially blind bore of a body, the accumulator comprising a slidable accumulator housing having a closed end received in said bore and defining with said bore a pressurizing chamber, the chamber including at least one passage for transmitting pressurized fluid therethrough, the closed end disposed opposite an end opening of the housing, a piston received in an interior opening of the housing, said piston extending from said end opening of the housing and having means for slideable sealing engaging slidably an interior surface of said interior opening, a pressurized medium disposed within said accumulator in order to displace apart the housing and piston, the piston comprising a generally U-shaped cross-section piston which permits an increased amount of pressurized medium to be contained within said piston and interior opening, the piston defining an integral piston profile which retains completely pressurized medium within said profile, the accumulator housing curved over at the end opening of the housing in order to provide a top abutment for an enlarged diameter section of said piston, and the piston engaging a stationary element disposed stationary relative to said body, the stationary element attached fixedly to said body to provide a stationary abutment for said piston, so that said accumulator housing moves in said bore to pressurize fluid within said chamber.

16. The accumulator in accordance with claim 15, wherein said piston comprises the enlarged diameter section and a reduced diameter section which extends from the end opening of the housing and abuts said stationary element.

17. The accumulator in accordance with claim 15, wherein pressurized fluid received through said passage may cause said accumulator housing to be displaced toward said stationary element so that, by reaction, the pressurized medium effects a counteracting force against the pressurized fluid.

18. The accumulator in accordance with claim 17, wherein the closed end of the accumulator housing includes means for sealing thereabout which slidably and sealingly engages a surface of the blind bore.

19. The accumulator in accordance with claim 18, wherein the sealing means comprises a ring disposed adjacent an O-ring.

20. The accumulator in accordance with claim 19, wherein the closed end of the accumulator housing comprises a cap that is one of attached fixedly to and integral with said housing, the cap having a recess receiving therein the ring and O-ring.

21. The accumulator in accordance with claim 10, wherein the piston includes a recess thereabout which receives a backup ring and said slidably sealing means.

* * * * *